United States Patent
Grondin et al.

(10) Patent No.: US 11,578,214 B2
(45) Date of Patent: Feb. 14, 2023

(54) METHOD OF MILLING MINERALS IN THE PRESENCE OF A POLY (ITACONATE)

(71) Applicant: COATEX, Genay (FR)

(72) Inventors: Henri Grondin, Sathonay Village (FR); Christian Jacquemet, Lyons (FR); Benoit Magny, Cailloux sur Fontaine (FR)

(73) Assignee: COATEX, Genay (FR)

( * ) Notice: Subject to any disclaimer, the term of this patent is extended or adjusted under 35 U.S.C. 154(b) by 974 days.

(21) Appl. No.: 16/342,431

(22) PCT Filed: Nov. 8, 2017

(86) PCT No.: PCT/FR2017/053043
§ 371 (c)(1),
(2) Date: Apr. 16, 2019

(87) PCT Pub. No.: WO2018/087469
PCT Pub. Date: May 17, 2018

(65) Prior Publication Data
US 2020/0291239 A1    Sep. 17, 2020

(30) Foreign Application Priority Data

Nov. 14, 2016 (FR) .................................... 1660970

(51) Int. Cl.
| | | |
|---|---|---|
| C09C 3/04 | (2006.01) | |
| C08F 2/38 | (2006.01) | |
| C08F 8/44 | (2006.01) | |
| C08F 222/02 | (2006.01) | |
| C08K 3/32 | (2006.01) | |
| D21D 99/00 | (2006.01) | |
| D21H 19/64 | (2006.01) | |

(52) U.S. Cl.
CPC ............. *C09C 3/041* (2013.01); *C08F 2/38* (2013.01); *C08F 8/44* (2013.01); *C08F 222/02* (2013.01); *C08K 3/32* (2013.01); *D21D 99/00* (2013.01); *D21H 19/64* (2013.01)

(58) Field of Classification Search
CPC ........ D21D 99/00; D21H 10/64; C09C 3/041; C08F 2/38; C08F 8/44; C08F 222/02; C08K 3/32
USPC .......................................................... 106/484
See application file for complete search history.

(56) References Cited

U.S. PATENT DOCUMENTS

| | | | | |
|---|---|---|---|---|
| 5,573,188 | A | * 11/1996 | Bousquet | ............... C09C 1/021 |
| | | | | 423/DIG. 15 |
| 9,487,423 | B1* | 11/2016 | Durant | ................... C09K 23/00 |
| 2011/0105670 | A1* | 5/2011 | Gane | ..................... C01F 11/185 |
| | | | | 524/425 |
| 2012/0264867 | A1 | 10/2012 | Gane et al. | |
| 2017/0036934 | A1 | 2/2017 | Durant et al. | |

FOREIGN PATENT DOCUMENTS

EP      2 143 688 A1    1/2010

OTHER PUBLICATIONS

International Search Report dated Jan. 24, 2018, in PCT/FR2017/053043 filed on Nov. 8, 2017.

* cited by examiner

*Primary Examiner* — Michael M. Bernshteyn
(74) *Attorney, Agent, or Firm* — Oblon, McClelland, Maier & Neustadt, L.L.P.

(57) ABSTRACT

The invention relates to a method for producing particles of mineral material comprising grinding of at least one mineral material in the presence of water. The grinding according to the invention is carried out in the presence of at least one polymer obtained by a radical polymerization reaction of a partial sodium salt of itaconic acid and partial decarboxylation of the polymer obtained followed by partial or total neutralization of the decarboxylated polymer. The invention also relates to an aqueous composition comprising particles of ground mineral material and such a polymer, in particular a mass-loading composition for the production of paper or a paper-coating-colour composition.

15 Claims, No Drawings

METHOD OF MILLING MINERALS IN THE PRESENCE OF A POLY (ITACONATE)

The invention relates to a method producing particles of mineral material comprising grinding of at least one mineral material in the presence of water. The grinding according to the invention is carried out in the presence of at least one polymer obtained by a radical polymerization reaction of a partial sodium salt of itaconic acid and partial decarboxylation of the polymer obtained followed by partial or total neutralization of the decarboxylated polymer. The invention also relates to an aqueous composition comprising particles of ground mineral material and such a polymer, in particular a mass-loading composition for the production of paper or a paper-coating-slip composition.

Methods of grinding mineral material are known, especially for grinding mineral materials used in the paper industry. In particular, there are known methods for grinding mineral material which use grinding aid agents, especially polymers derived from unsaturated monomers comprising one or more carboxylic acid functions. These grinding aid agents control the rheology of the suspension during the grinding operation. Generally, these grinding aid agents reduce as much as possible the flow limit of the mineral filler suspension for grinding while maintaining a high level of viscosity during the grinding operation.

In general, the methods of grinding mineral material must be effective and make it possible to control the particle size of the particles obtained.

Furthermore, the mineral grinding methods must have a high efficiency in terms of grinding time for a particular grain size for a defined quantity of mineral material. In fact, for the production of a defined quantity of mineral particles of specific particle size, a reduced use time of the grinding facilities improves the overall yield of the grinding method.

Similarly, it is important to have methods of grinding mineral material that make it possible to produce aqueous suspensions of mineral material particles which are stable shortly after grinding but also several hours or days after grinding. The phenomena of viscosity drift must be controlled because they can lead to gelation of the produced suspensions which would render handling difficult or impossible. Similarly, the sedimentation phenomena of the particles must be avoided or strongly slowed down.

In addition to controlling the stability, it is also essential to control the viscosity of the aqueous suspensions of ground mineral material particles.

The possibility of producing aqueous suspensions of mineral particles possessing a high solid content is equally important. A high solid content of these aqueous suspensions of mineral material particles makes it possible in particular to increase the productivity of the processes which use these suspensions.

In addition, from an environmental standpoint, it is important to have grinding aid agents produced from reagents of natural origin, in particular reagents of plant origin.

Furthermore, during papermaking, aqueous mineral filler compositions are used to provide a mineral filler within the pulp comprising water and fibres of vegetable origin, in particular fibres of cellulosic material. Within these compositions, the mineral filler is in the form of particles. The use of such mineral fillers makes it possible in particular, to improve the physical properties of paper, in particular to improve its optical properties, or to reduce the relative amount of cellulosic material in relation to the amount of mineral filler.

Improving the efficiency of papermaking processes is also permitted through the use of these mineral fillers.

In order to improve the use of these mineral filler compositions during papermaking, more particularly to retain these mineral fillers in the fibrous mat during the manufacture of a sheet of paper, the use of cationic compounds is known, in particular cationic starches or cationic acrylamide copolymers. These cationic compounds or cationic mineral filler retention agents make it possible in particular to increase the retention of mineral fillers on fibres or fibrils of plant origin during papermaking. In particular, by neutralizing the charges borne by the mineral filler particles, these cationic retention agents make it possible to form cationic coagulants retained by fibres or fibrils of plant origin. These cationic compounds also make it possible to improve the dewatering phase during papermaking during which the largest possible amount of mineral filler must be retained in the fibrous mat of the paper sheet. Finally, these cationic compounds also improve the properties, in particular the optical properties, of the manufactured paper. Moreover, these cationic compounds also limit the loss of cellulosic material in the form of fine particles. Thus, conventionally in papermaking, cationic compounds are used, in particular cationic agents such as cationic flocculating agents, cationic coagulants or cationic agents for the retention of mineral filler or cellulosic material.

The reduction of the absolute value of the Mütek charge or of the cationic demand of a suspension of mineral material particles in water must also be sought.

The cationic demand can be determined using a current flow meter of the mineral charge suspension (flow current detector or streaming current detector). This current flow measurement can be performed using a Mütek apparatus by polyDADMAC casting until neutralization of the electric charges of the mineral charge suspension. This then gives a value of the Mütek charge of the mineral charge suspension.

During papermaking, it is generally sought to increase the relative amount of mineral filler with respect to the amount of cellulosic material, therefore leading to an increase in the amount of cationic agents used. The reduction of the necessary amount of these cationic agents is therefore sought while maintaining the efficiency of papermaking methods.

The mineral filler suspensions used in papermaking should also help improve the appearance of paper for a defined quantity of mineral filler used.

The formation of flocs of mineral filler particles or fibres affecting paper quality should also be limited.

Improving the compatibility of the different compounds used in the production of paper should also be sought.

EP 2143688 discloses a method of manufacturing a calcium carbonate slurry using an acrylic polymer which is different from itaconic acid. U.S. Pat. No. 9,487,423 discloses a method for producing a partially decarboxylated itaconic acid polymer. U.S. Pat. No. 5,573,188 relates to a method of grinding calcium carbonate in the presence of an acidic polymer other than itaconic acid.

Thus, although there are wet milling processes of mineral material which use polymers as a grinding aid agent, the state of the art methods do not always provide a satisfactory solution to the encountered problems. There is therefore a need for improved methods for grinding mineral material in water.

The method according to the invention provides a solution to all or part of the problems of the state of the art methods.

Thus, the invention provides a method for producing particles of mineral material comprising grinding, in the presence of water, at least one mineral material in the presence of at least one polymer obtained:

(a) by a radical polymerization reaction in the presence of sodium hypophosphite, at a temperature above 50° C., of a partial sodium salt of itaconic acid and partial decarboxylation of the polymer obtained and (b) partial or total neutralization of the decarboxylated polymer resulting from step (a), using a derivative comprising sodium.

During the grinding method according to the invention, the mineral material used can be in various forms, especially in the form of coarse sized grains from blocks or pieces of crushed mineral material. During grinding according to the invention, the block sizes of mineral material or pieces of mineral material used is reduced until particles are obtained. The method according to the invention is particularly effective for controlling the size of the particles produced during grinding of mineral material.

For the method according to the invention, the particle size is defined by their median diameter $d_{50}$ for which at least half of a particle population is smaller than a given value. Thus, the particles having a size smaller than 50 μm are particles at least half a weight of which have a diameter of less than 50 μm.

Preferably, the method according to the invention relates to the production of particles the size of which is less than 50 microns or the size of which ranges from 0.05 to 50 microns.

More preferably, the method according to the invention relates to the production of particles of mineral material the size of which is less than 10 microns, or less than 5 microns or 2 microns. More preferably, the particle size of the mineral material is less than 1 μm or less than 0.5 μm.

Preferably for the method according to the invention, at least 50% by weight of the particles range between 0.5 to 50 microns or are less than 10 microns in size. Particularly, at least 50% by weight of the particles have a size of less than 5 μm or 2 μm, or even less than 1 μm.

Advantageously for the method according to the invention, at least 60% by weight of the particles range between 0.5 to 50 microns or are less than 10 microns in size. Particularly, at least 60% by weight of the particles have a size of less than 5 μm or 2 μm, or less than 1 μm.

Also advantageous for the method according to the invention, at least 75% by weight of the particles range between 0.5 to 50 microns or are less than 10 microns in size. Particularly, at least 75% by weight of the particles have a size of less than 5 μm or 2 μm, or less than 1 μm.

Also advantageous for the method according to the invention, at least 90% by weight of the particles range between 0.5 to 50 microns or are less than 10 microns in size. Particularly, at least 90% by weight of the particles have a size of less than 5 μm or 2 μm, or even less than 1 μm.

Preferably, the method according to the invention uses at least one synthetic mineral material or of natural origin.

Also preferably, the method according to the invention implements at least one mineral material selected from alkaline earth metal carbonates, preferably calcium carbonate (natural calcium carbonate or precipitated calcium carbonate), strontium carbonate, magnesium carbonate, barium carbonate, dolomite, kaolin, titanium dioxide, talc, lime, calcium sulphate, barium sulphate. More preferably, the method according to the invention uses at least one mineral material selected from natural calcium carbonate, precipitated calcium carbonate, dolomite, kaolin, calcined kaolin, titanium dioxide, talc, lime.

The method according to the invention can implement a single mineral or several mineral materials. Thus, the method according to the invention may use two or three mineral substances. In particular, the method according to the invention can use calcium carbonate and at least one other mineral material selected from dolomite, kaolin, calcined kaolin, titanium dioxide, talc, lime, especially calcium carbonate and kaolin or calcium carbonate and lime. Similarly, the method according to the invention can use titanium dioxide and at least one other mineral material selected from calcium carbonate, dolomite, kaolin, talc, lime, especially titanium dioxide and kaolin or titanium dioxide and lime. In addition, the method according to the invention may use kaolin or calcined kaolin and at least one other mineral material selected from dolomite, talc, lime. The method according to the invention can also use talc and lime or talc and dolomite.

In addition to a mineral material, the method according to the invention uses at least one particular polymer resulting from a radical polymerization reaction, in the presence of sodium hypophosphite, a partial sodium salt of itaconic acid and partial decarboxylation of the obtained polymer.

Preferably, the polymerization reaction is carried out in water, in a solvent, alone or in a mixture with water, especially an alcoholic solvent, in particular isopropyl alcohol. In a particularly preferred manner, the polymerization reaction is carried out in water.

Also preferably, the polymerization reaction is carried out in the presence of at least one radical generating compound, preferably a radical generating compound selected from hydrogen peroxide, sodium persulfate, potassium persulfate, ammonium persulfate, alkyl hydroperoxide, aryl hydroperoxide and mixtures thereof. In a particularly preferred manner, the polymerization reaction is carried out in the presence of a radical-generating compound selected from hydrogen peroxide, sodium persulfate, potassium persulfate and ammonium persulfate.

Also preferably, the polymerization reaction can be carried out in the presence of another chain transfer agent, preferably a chain transfer agent selected from the salts of dipropionate trithiocarbonate (DPTTC or 2,2'-disodium (thiocarbonylbisthio)-dipropanoate—CAS No. 864970-33-2), especially its sodium salts; Isopropylic alcohol; mercaptan compounds. In a particularly preferred manner, the polymerization reaction is carried out in the presence of DPTTC or of its salts, in particular its sodium salts. DPTTC can be implemented in the form of an aqueous solution.

The method according to the invention implements a partial sodium salt of itaconic acid as a monomer for the production of the polymer used during the grinding of a mineral material. This partial sodium salt of itaconic acid is obtained by partially neutralizing at least one of the two carboxylic acid functions of itaconic acid. This neutralization corresponds to the salification of at least one of these two carboxylic acid functions. It is carried out using at least one compound comprising sodium, for example sodium hydroxide or sodium carbonate, sodium bicarbonate, preferably sodium hydroxide.

The first carboxylic acid function, or first acidity, of itaconic acid is the distal carboxylic acid function furthest from the ethylenic unsaturation. It has a dissociation constant ($pK_a$) of 3.85 to 25° C. The second carboxylic acid function, or second acidity, of itaconic acid is the proximal carboxylic acid function, the closest to ethylenic unsaturation. It has a dissociation constant ($pK_a$) of 5.45 to 25° C.

According to the invention, the first acidity of itaconic acid is partially or totally salified to yield the partial salt of itaconic acid used. In a preferred manner according to the invention, the first acidity of itaconic acid is totally salified and the second acidity of itaconic acid is partially salified. Also preferably according to the invention, the first acidity of itaconic acid is partially salified and the second acidity of itaconic acid is not salified. More preferably according to the invention, the first acidity of itaconic acid is totally salified and the second acidity of itaconic acid is not salified.

In a particularly preferred manner according to the invention, the first acidity of itaconic acid is totally salified and the second acidity of itaconic acid is salified to 20 mol %. In a more particularly preferred manner according to the invention, the first acidity of itaconic acid is totally salified and the second acidity of itaconic acid is salified to 40 mol %. Even more preferably according to the invention, the first acidity of itaconic acid is totally salified and the second acidity of itaconic acid is salified to 60 mol %. Furthermore, for the method according to the invention, the first and second acidities of itaconic acid can be totally salified and the polymerization reaction conducted in the presence of an acid.

The reaction conditions used during the production of the partial sodium salt of itaconic acid according to the invention are generally known as such, for example in the document WO 2015-100412.

In a preferred manner according to the invention, the partial sodium salt of itaconic acid used according to the invention is obtained from itaconic acid of natural origin, in particular from itaconic acid of vegetable origin.

Also preferably, the polymer used according to the invention is a polymer of at least one partial sodium salt of itaconic acid according to the invention. Thus, the polymer comprises only units derived from the partial sodium salt of itaconic acid with the exception of the units resulting from the sodium hypophosphite used or from any other chain transfer agent used.

The weight-average molecular weight $M_W$ (measured by CES or size exclusion chromatography) of the polymer used according to the invention can vary quite widely.

Also preferably, the polymer according to the invention has a weight-average molecular weight $M_W$ less than 20,000 g/mol. More preferably, the polymer according to the invention has a weight-average molecular weight $M_W$ less than 15,000 g/mol or less than 10,000 g/mol. Even more preferentially, the polymer according to the invention has a weight-average molecular weight $M_W$ less than 5,000 g/mol or less than 3,000 g/mol.

Also preferably, the polymer according to the invention has a weight-average molecular weight $M_W$ greater than 1,000 g/mol. More preferably, the polymer according to the invention has a weight-average molecular weight $M_W$ greater than 1,200 g/mol.

Thus, the polymer according to the invention preferably has a weight average molecular mass $M_W$ ranging from 1,000 g/mol to 20,000, 15,000, 10,000, 5,000 or to 3,000 g/mol. More preferably, the polymer according to the invention has a weight average molecular mass $M_W$ ranging from 1,200 g/mol to 20,000, 15,000, 10,000, 5,000 or to 3,000 g/mol. According to the invention, the IP polymolecularity index, or polydispersity index, of the polymer used is less than 4. Preferably, the polymolecularity index IP of the polymer ranges from 1.2 to 4 or from 1.5 to 4. More preferably, the polymolecularity index IP of the polymer ranges from 2 to 3 or 1.5 to 3 or from 1.2 to 2.5 or 1.5 to 2.5.

An essential step in the production of the polymer used according to the invention is the radical polymerization reaction of the partial sodium salt of itaconic acid. The polymerization reaction is carried out in the presence of sodium hypophosphite and at a temperature above 50° C. The polymerization reaction is known as such.

Preferably, it can be carried out at a temperature above 80° C. or above 95° C. It can be carried out in a solvent selected from water, organic solvents and their mixtures, preferably in water.

Preferably during the polymerization reaction, a radical generating compound can be used. The preferred radical generating compound is selected from a peroxide compound, preferably hydrogen peroxide, benzoyl peroxide, benzoyl hydroperoxide and mixtures thereof; alkali metal persulfates, especially sodium persulfate and potassium persulfate; ammonium persulfate; partially water-soluble peroxides, in particular succinic peracid, hydroperoxide t-butyl, cumyl hydroperoxide; persulfates associated with a ferrous ion, a sulphite ion or a bisulphite ion; azo compounds, for example azo-bis-isobutyronitrile (AZDN or AIBN); and mixtures thereof. The particularly preferred radical generating compound is selected from a hydrogen peroxide compound; alkali metal persulfates, especially sodium persulfate and potassium persulfate; ammonium persulfate.

Particular reaction conditions of the polymerization reaction are described in WO 2015-100412.

Another essential step in the production of the polymer used according to the invention is partial decarboxylation. In an essential manner for the invention, the decarboxylation is partial so that the polymer used during the grinding of the mineral material comprises free or salified residual carboxylic acid functions, preferably salified residual carboxylic acid functions. The partial decarboxylation of the polymer can be carried out during the polymerization or after the polymerization reaction. It can also be partly carried out during the polymerization reaction and partly after the polymerization reaction.

According to the invention, partial decarboxylation can be carried out by heating, for example by heating in an aqueous medium. Preferably, partial decarboxylation can be carried out at the polymerization temperature or at a temperature above the polymerization temperature of the partial salt of itaconic acid sodium. The decarboxylation temperature may be greater than 60° C. and up to 160° C. It may be greater than 85° C. or greater than 100° C. or 110° C. The decarboxylation temperature may also be greater than 120° C., for example, 125° C. Advantageously, the partial decarboxylation can be carried out in water and refluxing.

The decarboxylation can also be carried out in the presence of one or more catalysts. As an example of decarboxylation catalysts, metal derivatives such as thorium dioxide or copper-based compounds may be used.

Thus, during decarboxylation, only certain carboxylic acid groups are removed; the neutralized carboxylic acid groups cannot be decarboxylated. The degree of decarboxylation can be evaluated in a known manner, for example by measuring the evolution of the amount of carbon dioxide released during the decarboxylation or also by the measurement of loss of mass.

In a preferred manner according to the invention, the partial sodium salt of itaconic acid polymer is partially decarboxylated, preferably 10 mol % or 20 mol % of the second acidity are decarboxylated. Also preferably, 30 mol % or 40 mol % of the second acidity are decarboxylated. Also preferably, 50 mol % or 60 mol % of the second acidity are decarboxylated. More preferably, 70 mol %, 80 mol % or 90 mol % of the second acidity are decarboxylated. More preferably, from 5 to 90 mol % or from 20 to 85 mol % or from 50 to 85 mol % of the second acidity of the polymer are decarboxylated.

In addition to the polymerization reaction and the decarboxylation, another essential step in the production of the polymer used according to the invention is the partial or total neutralization of the decarboxylated polymer. According to the invention, this neutralization therefore takes place at the end of step (a).

According to the invention, the degree of neutralization of the partially decarboxylated polymer can vary significantly. The partially decarboxylated polymer can therefore be completely neutralized or partially neutralized. Preferably, the partially decarboxylated polymer is neutralized to 40 mol % or 50 mol %. More preferably, the partially decarboxylated polymer is neutralized to 60 mol % or 70 mol %. Also more preferably, the partially decarboxylated polymer is neutralized to 80 mol % or 90 mol %. The partially decarboxylated polymer may also be neutralized to 95 mol % or 100 mol %.

Also preferably, this neutralization is carried out by means of a derivative comprising sodium. More preferably, the polymer is neutralized with sodium hydroxide, sodium carbonate or sodium bicarbonate, especially sodium hydroxide.

Particular conditions of decarboxylation or neutralization are described in document FR 1515558.

The implementation of the particular polymer during the grinding method according to the invention makes it possible to obtain particles of mineral material having particularly advantageous properties during their use, in particular when they are used as paper-mass-loading. In particular, the method according to the invention makes it possible to produce particles of mineral material for the production of aqueous suspensions having a reduced cationic demand.

Preferably, the method according to the invention makes it possible to produce an aqueous suspension of particles of mineral material of median size of 1.5±0.15 µm having a cationic demand less than or equal in absolute value to 5µ-equivalent per g of suspending particles in water at a concentration of 65 to 75% by weight. The aqueous suspension of mineral material particles with a median size of 1.5±0.15 µm therefore has a cationic demand estimated by measuring the flow current of the mineral charge suspension, measured in water, at a temperature of concentration of 65 to 75% by weight using a Mütek apparatus with polydiallyldimethylammonium chloride (polyDADMAC or polyDDA—CAS no 26062-79-3) 0.001 N of particular molecular weight, less than or equal in absolute value to 5µ-equivalent per g of suspension of particles of mineral material in water.

Also preferably, the method according to the invention makes it possible to produce an aqueous suspension of particles of mineral material of median size of 0.7±0.15 µm with a cationic demand less than or equal in absolute value to 13µ-equivalent per g of suspending particles in water at a concentration of 65 to 75% by weight. The aqueous suspension of mineral material particles having a median size of 0.7±0.15 µm then has a cationic demand estimated by measuring the flow current of the mineral charge suspension, measured in water, at a temperature of concentration of 75% by weight using a Mütek apparatus with polyDADMAC (0.001 N), less than or equal in absolute value to 13µ equivalent per g of suspension of particles of mineral material in water.

The invention also relates to the use as grinding aid agent of mineral material particles, of at least one polymer obtained:

(a) by a radical polymerization reaction in the presence of sodium hypophosphite, at a temperature above 50° C., of a partial sodium salt of itaconic acid and partial decarboxylation of the polymer obtained and (b) partial or total neutralization of the decarboxylated polymer resulting from step (a), using a derivative comprising sodium.

The particular, advantageous or preferred characteristics of the grinding method according to the invention define uses according to the invention which are also particular, advantageous or preferred.

In addition to grinding, the invention also relates to an aqueous composition. The aqueous composition according to the invention comprises particles of ground mineral material and at least one polymer defined for the grinding method according to the invention. The particular, advantageous or preferred characteristics of the grinding method according to the invention define aqueous compositions according to the invention which are also particular, advantageous or preferred.

In a preferred manner for the aqueous composition according to the invention, the aqueous suspension of mineral material particles having a median size of 1.5±0.15 µm has a cationic demand which is less than or equal in absolute value to 5µ-equivalent per g of suspension of particles in water at a concentration of 65 to 75% by weight. Also preferably for the aqueous composition according to the invention, the aqueous suspension of mineral material particles with a median size of 0.7±0.15 µm has a cationic demand which is less than or equal in absolute value to 13µ-equivalent per g suspending particles in water at a concentration of 65 to 75% by weight.

In a particularly preferred manner, the aqueous composition according to the invention also comprises at least one cellulosic material. Preferably, these cellulosic materials are cellulosic fibre or fibrils of cellulosic material.

The aqueous composition according to the invention may also comprise at least one additive, preferably an additive selected from a sizing agent for cellulosic material, a retention agent for particles of mineral material or a retention agent for fine cellulose particles.

Particularly preferably, the aqueous composition according to the invention is an aqueous paper production composition which comprises particles of ground mineral material and at least one polymer defined for the grinding method according to the invention. In a particularly preferred manner, the aqueous paper production composition according to the invention comprises particles of ground mineral material and at least one polymer defined for the grinding method according to the invention, at least one cellulosic material, preferably fibres of cellulosic material or fibrils of cellulosic material, and at least one additive, preferably an additive selected from a sizing agent of the cellulosic material, a particulate retention agent of mineral material. The aqueous paper production composition according to the invention can take the form of a paper-mass-loading composition.

The invention also provides a method for producing a paper-mass-loading composition comprising an aqueous suspension of particles of mineral material obtained by a method comprising the grinding, in the presence of water, of at least one mineral material in the presence of at least one polymer obtained:

(a) by a radical polymerization reaction in the presence of sodium hypophosphite, at a temperature above 50° C., of a partial sodium salt of itaconic acid and partial decarboxylation of the polymer obtained then (b) partial or total neutralization of the decarboxylated polymer resulting from step (a), using a derivative comprising sodium, to form the aqueous suspension of mineral material particles.

Similarly, the invention also provides a method for producing a paper coating colouring composition comprising an aqueous suspension of particles of mineral material obtained by a method comprising grinding, in the presence of water, of at least one mineral material in the presence of at least one polymer obtained according to the invention.

The particular, advantageous or preferred characteristics of the grinding method according to the invention define methods for producing paper furnish compositions according to the invention or paper coating colour compositions which are also particular, advantageous or preferred.

The invention also provides a paper production method comprising the use of an aqueous composition according to the invention or a paper-mass-loading composition according to the invention.

The method of producing paper according to the invention enables the reduction the quantity of cationic agents used. Preferably, the paper production method according to the invention enables the reduction of the quantity of cationic flocculating agents, to reduce the quantity of cationic coagulants or to reduce the quantity of cationic agents for mineral charge retention. This reduction is possible with respect to a known method which does not use a polymer according to the invention or with respect to a known method using a state of the art polymer.

The following examples illustrate the various aspects of the invention. The methods or techniques used are known or described.

Molecular Weight by Size Steric Exclusion Chromatography (CES):

The molecular weights and polymolecularity indices of the polymers obtained by a radical polymerization reaction of a partial sodium salt of itaconic acid and partial decarboxylation of the polymers obtained and then partial or total neutralization of the decarboxylated polymer are determined by steric exclusion chromatography.

A test portion of the polymer solution corresponding to 90 mg of dry matter is introduced into a 10 mL flask. The mobile phase, supplemented with 0.04% dimethylformamide (DMF), is added to a total mass of 10 g. The composition of this mobile phase is as follows: $NaHCO_3$: 0.05 mol/L, $NaNO_3$: 0.1 mol/L, triethanolamine: 0.02 mol/L, $NaN_3$ 0.03% mass.

The CES chain is composed of a water 510 isocratic type pump, the flow rate of which is set to 0.8 mL/min, a Waters 717+ sample changer, an oven containing a guard type precolumn Column Ultrahydrogel Waters of 6 cm in length and 40 mm in inner diameter, followed by a linear column of Ultrahydrogel Waters type of 30 cm long and 7.8 mm inside diameter.

Detection is provided by means of a Waters 410 RI differential refractometer. The oven is heated to 60° C. and the refractometer is heated to 45° C.

The CES device is calibrated with a series of sodium polyacrylate standards provided by Polymer Standards Service with a peak molecular weight of between 1,000 and $1.10^6$ g/mol and of polymolecularity index between 1.4 and 1.7, as well as with a sodium polyacrylate with a molecular weight of 5,600 g/mol and a polymolecularity index equal to 2.4. The calibration curve is of linear type and takes into account the correction obtained thanks to the flow rate marker: dimethylformamide (DMF).

Acquisition and processing of the chromatogram are performed using the PSS WinGPC Scientific v 4.02 software. The chromatogram obtained is integrated in the zone corresponding to molecular weights greater than 65 g/mol.

Grinding Technique and Particle Size Measurement:

With the aid of a peristaltic pump, suspensions of coarse grains of mineral material produced in the presence of a polymer according to the invention are introduced into a Dyno Mill crusher type KDL pilot 1.4 L containing 2,500 g of beads in ceramic type ER 120 S 0.6 to 1.0 mm in diameter from the company ZirPro. The grinding conditions are adjusted so as to obtain a suspension of particles of mineral material of desired particle size. This suspension is then characterized by a particle size measurement, a Brookfield viscosity measurement as well as a flow current or cationic demand measurement.

The particle size characteristics regarding the production of mineral material particles are determined from a Sedigraph 5100 apparatus (Micrometrics, USA). In a known manner, this method and this measuring instrument make it possible to measure the particle size distribution of the suspensions of mineral material particles. They make it possible in particular to determine the value of the median diameter or median size of the suspension of particles of mineral material ($d_{50}$). These measurements are carried out from a suspension of particles of diluted mineral material at a concentration of approximately 33 g of dry matter per litre of solution of a sodium polyacrylate with a molecular weight of 4,000 g/mol and concentration equal to 1.6 g of dry sodium polyacrylate per litre of solution. This sample is dispersed and sonicated before measurement.

Brookfield Viscosity Measurement:

Brookfield viscosities (mPa·s) of suspensions of mineral material particles produced according to the method of the invention are measured after the milling operation at 25±1° C. and at a rotation speed of 100 rpm using a Brookfield DVIII viscometer equipped with a suitable module, for example 2 to 5.

Mütek Charge Measurement or Cationic Demand:

Measurements of the flow current or cationic demand of the suspensions of mineral particles are carried out using a Mütek PCD 03 device equipped with an automatic titrator PCD titrator two. The suspensions are titrated with a cationic polymer of known concentration until neutralization of the charges contained in the suspension sample of mineral filler particles to be characterized. The titrant solution is a poly-DADMAC solution with a molecular mass of between 10,000 and 400,000 g/mol. The certified solution of this polymer titrating to the concentration of 0.001 N is commercial (Noviprofibre, France).

When measuring the cationic demand of the aqueous suspension of mineral filler particles, approximately 0.8 g of suspension is weighed into the measuring cell and then 20 mL of bipermuted water are added. The piston is placed in the cell and the engine is started by moving the piston back and forth. Then, the titration is performed after 2 to 3 min. At the end of the titration, the device indicates the result on the screen in µ-equivalent/g of suspension. The cationic demand of the aqueous suspensions of mineral charge particles is expressed in µ-equivalent/g of suspension.

EXAMPLE 1

From itaconic acid partially neutralized with soda added slowly, with stirring and at a controlled temperature, then polymerized by heating in water and stirring in the presence of sodium hypophosphite and tertiobutyl hydroperoxide or hydrogen peroxide, and finally partially decarboxylated by heating under reflux in water, a polymeric solution (P1-1) of partially decarboxylated sodium polyitaconate having a concentration of 40% by weight of polymer and a pH of 9 is produced (described method in the examples of WO 2015-100412).

Then, a suspension of calcium carbonate particles (S1-1) is produced by grinding coarsely crushed calcite rock from the region of Orgon, France (BL 200, Omya) in the presence of polymer (P1-1) (0.26% by dry weight of polymer relative to the amount of calcite rock) as grinding aid agent. The obtained suspension has a solid mineral content of 75±1% by weight. Grinding conditions are adjusted in order to obtain a suspension of calcium carbonate particles the median diameter of which is 1.5±0.15 µm.

Similarly, suspensions of calcium carbonate particles (S1-2) to (S1-4) are produced by means of polymer solutions (P1-2) to (P1-4) of other partially decarboxylated sodium polyitaconates. Finally, a comparative suspension of calcium carbonate particles (S1-C) is produced using a known polymeric solution of sodium polyacrylate (P1-C) (Rheosperse 3206, Coatex) used at the same dose and the same conditions.

The characteristics of polymers ($M_w$, IP and decarboxylation rate of the second acidity in mol %) and suspensions ($d_{50}$, Brookfield viscosity at 100 rpm measured at 25° C. and absolute value of Mütek charge) are shown in table 1.

TABLE 1

|  | Polymer | | | | |
| --- | --- | --- | --- | --- | --- |
|  | (P1-1) | (P1-2) | (P1-3) | (P1-4) | (P1-C) |
| $M_w$ (g/mol) | 2,140 | 2,200 | 2,740 | 4,500 | 4,540 |
| IP | 1.73 | 1.72 | 1.82 | 2.01 | 2.12 |
| decarboxylation rate (%) | 81 | 63 | 75 | 80 | / |
| suspension | (S1-1) | (S1-2) | (S1-3) | (S1-4) | (S1-C) |
| $d_{50}$ (µm) | 1.55 | 1.62 | 1.48 | 1.61 | 1.61 |
| viscosity (mPa · s) | 150 | 270 | 260 | 305 | 120 |
| | Mütek charge | (µeq/g) | 4.6 | 5.0 | 4.3 | 5.0 | 6.5 |

It is observed that the grinding aid agents according to the invention make it possible to produce suspensions of low-viscosity ground calcium carbonate mineral filler with a median diameter of 1.5±0.15 µm. The cationic demand of these suspensions of mineral charge is less than or equal in absolute value to 5µ-equivalents per gram of suspension of particles in water at a concentration of 75% by weight.

EXAMPLE 2

In a similar manner to example 1, suspensions of calcium carbonate particles (S2-1) and (S2-2) are produced by grinding coarsely crushed calcite rock originating from the region of Orgon, France (BL 200, Omya) in the presence of polymeric solutions (P1-1) and
(P1-3) at 40% by weight of polymer and pH of 9 (0.6% by dry weight of polymer in relation to the amount of rock calcite) as grinding aid agents. The obtained suspensions have a solid mineral content of 75±1% by weight. Grinding conditions are adjusted in order to obtain a suspension of calcium carbonate particles the median diameter of which is 0.7±0.15 µm.

Under the same conditions, a comparative suspension of calcium carbonate particles (S2-C) is also produced using a polymer solution of a sodium polyacrylate (P1-C).

The characteristics of polymers ($M_w$, IP and decarboxylation rate of the second acidity in mol %) and suspensions ($d_{50}$, Brookfield viscosity at 100 rpm measured at 25° C. and absolute value of Mütek charge) are shown in table 2.

TABLE 2

|  | polymer | | |
| --- | --- | --- | --- |
|  | (P1-1) | (P1-3) | (P1-C) |
| $M_w$ (g/mol) | 2,140 | 2,740 | 4,540 |
| IP | 1.73 | 1.82 | 2.12 |
| decarboxylation rate (%) | 81 | 75 | / |
| suspension | (S2-1) | (S2-2) | (S2-C) |
| $d_{50}$ (µm) | 0.74 | 0.70 | 0.74 |
| viscosity (mPa · s) | 320 | 590 | 150 |
| | Mütek charge | (µeq/g) | 12.3 | 11.8 | 15.6 |

Once again, it is found that the grinding aid agents according to the invention make it possible to produce suspensions of low viscosity ground calcium carbonate mineral filler the median diameter of which is 0.7±0.15 µm. The cationic demand for these suspensions of mineral filler particles is less than or equal in absolute value to 13µ-equivalents per gram of suspension of particles in water at a concentration of 75% by weight.

EXAMPLE 3

According to the method of example 1, from itaconic acid partially neutralized with sodium hydroxide and then polymerized in water in the presence of sodium hypophosphite and finally partially decarboxylated, a polymeric solution (P3-1) of partially decarboxylated sodium polyitaconate having a concentration of 42% by weight of polymer and a pH of 5.5.

Then, a suspension of calcium carbonate particles and lime particles (S3-1) is produced by grinding coarsely crushed calcite rock from the region of Orgon, France (BL 200, Omya) and lime hydrated (Supercalco 95—Carmeuse) (ratio calcium carbonate/lime hydrated to 100/0.1 by weight) in the presence of polymer (P3-1) (0.26% by dry weight of polymer in relation to the amount of rock calcite and lime) as a grinding aid. The suspension obtained has a solid mineral content of 75±1% by weight. Grinding conditions are adjusted in order to obtain a suspension of calcium carbonate particles the median diameter of which is 1.5±0.15 µm.

The characteristics of the polymer ($M_w$, IP and decarboxylation rate of the second acidity in mol %) and of the suspension ($d_{50}$, Brookfield viscosity at 100 rpm measured at 25° C. and absolute value of Mütek charge) are shown in Table 3.

TABLE 3

| polymer | (P3-1) |
| --- | --- |
| $M_w$ (g/mol) | 2,000 |
| IP | 1.64 |
| decarboxylation rate (%) | 69 |
| suspension | (S3-1) |
| $d_{50}$ (µm) | 1.56 |
| viscosity (mPa · s) | 105 |
| |Mütek charge| (µeq/g) | 4.5 |

It is observed that the grinding aid agent according to the invention makes it possible to produce a suspension of low viscosity mineral fillers the median diameter of which is 1.5±0.15 µm. The cationic demand of this suspension is less than or equal in absolute value to 5μ-equivalent per gram of suspension of particles in water at a concentration of 75% by weight.

EXAMPLE 4

In a similar manner to example 1, a suspension of calcium carbonate particles (S4-1) is produced by grinding coarsely crushed calcite rock originating from the region of Orgon, France (BL 200, Omya) in the presence a polymer (P4-1) at 40% by weight of polymer and a pH of 11.8 (0.26% by dry weight of polymer relative to the amount of calcite rock) as a grinding aid. The obtained suspension has a solid mineral content of 75±1% by weight. Grinding conditions are adjusted in order to obtain a suspension of calcium carbonate particles the median diameter of which is 1.5±0.15 μm.

The characteristics of the polymer ($M_w$, IP and decarboxylation rate of the second acidity in mol %) and of the suspension ($d_{50}$, Brookfield viscosity at 100 rpm measured at 25° C. and absolute value of Mütek charge) are shown in Table 4.

TABLE 4

| polymer | (P4-1) |
| --- | --- |
| $M_w$ (g/mol) | 3,600 |
| IP | 2.00 |
| decarboxylation rate (%) | 70 |
| suspension | (S4-1) |
| $d_{50}$ (μm) | 1.56 |
| viscosity (mPa · s) | 191 |
| \|Mütek charge\| (μeq/g) | 4.7 |

It is observed that the grinding aid agent according to the invention makes it possible to produce a suspension of low viscosity mineral fillers the median diameter of which is 1.5±0.15 μm. The cationic demand of this suspension is less than or equal in absolute value to 5μ-equivalent per gram of suspension of particles in water at a concentration of 75% by weight.

EXAMPLE 5

In a similar manner to example 1, suspensions of calcium carbonate particles (S5-1) and (S5-2) are produced by grinding coarsely crushed calcite rock originating from the region of Orgon, France (BL 200, Omya) in the presence of polymeric solutions (P5-1) and
(P5-2) at 40% by weight of polymer and pH of 9 (0.20% by dry weight of polymer in relation to the amount of rock calcite) as grinding aid agents. The obtained suspensions have a solid mineral content of 65±1% by weight. Grinding conditions are adjusted in order to obtain a suspension of calcium carbonate particles the median diameter of which is 1.5±0.15 μm.

The characteristics of polymers ($M_w$, IP and decarboxylation rate of the second acidity in mol %) and suspensions ($d_{50}$, Brookfield viscosity at 100 rpm measured at 25° C. and absolute value of Mütek charge) are shown in table 5.

TABLE 5

| polymer | (P5-1) | (P5-2) |
| --- | --- | --- |
| $M_w$ (g/mol) | 2,400 | 2,280 |
| IP | 1.82 | 1.76 |
| decarboxylation rate (%) | 20 | 32 |

TABLE 5-continued

| suspension | (S5-1) | (S5-2) |
| --- | --- | --- |
| $d_{50}$ (μm) | 1.58 | 1.57 |
| viscosity (mPa · s) | 1,400 | 544 |
| \|Mütek charge\| (μeq/g) | 2.6 | 2.5 |

It is further observed that the grinding aid agents according to the invention make it possible to produce suspensions of low viscosity mineral filler particles the median diameter of which is 1.5±0.15 μm. The cationic demand of these suspensions is less than or equal in absolute value to 5μ-equivalent per gram of suspension of particles in water at a concentration of 65% by weight.

All of these examples indicate that the different grinding aid agents according to the invention make it possible to obtain good efficiency during operations of grinding coarse grains of mineral particles. They make it possible to produce suspensions of mineral material particles with well controlled particle size and concentration. These suspensions can then be perfectly pumped and conveyed in the facilities used later, especially during the production of paper-mass composition.

In addition, when these suspensions are used for the production of mass composition of paper mass, their low absolute values of the Mütek charge reduces the quantities of cationic compounds used in these compositions.

The invention claimed is:

1. A method for producing mineral material particles, the method comprising grinding at least one mineral material in the presence of water and at least one polymer so that the at least one mineral material has a particle size of 0.05-50 μm, wherein the at least one polymer is obtained by:
    performing a radical polymerization reaction of a partial sodium salt of itaconic acid in the presence of sodium hypophosphite, at a temperature above 50° C. to obtained an itaconic acid polymer;
    partially decarboxylating the itaconic acid polymer to obtain a decarboxylated polymer; and
    partially or totally neutralizing the decarboxylated polymer with a derivative comprising sodium to obtain the at least one polymer.

2. The method according to claim 1, wherein
    only one mineral material or two or three mineral substances are used; or
    the mineral material is synthetic or of natural origin.

3. The method according to claim 1, wherein the polymerization reaction is carried out:
    in water, in a solvent, alone or in a mixture with water; or
    in the presence of at least one radical generating compound; or
    in the presence of at least one chain transfer agent.

4. The method according to claim 1, wherein:
    the first acidity of itaconic acid of the partial sodium salt of itaconic acid is partially salified and the second acidity of itaconic acid of the partial sodium salt of itaconic acid is not salified; or
    the first acidity of itaconic acid of the partial sodium salt of itaconic acid is totally salified and the second acidity of itaconic acid of the partial sodium salt of itaconic acid is not salified; or
    the first acidity of itaconic acid of the partial sodium salt of itaconic acid is totally salified and the second acidity of itaconic acid of the partial sodium salt of itaconic acid is partially salified.

5. The method according to claim 1, wherein the polymer:
has a weight average molecular mass $M_w$, measured by CES, of less than 20,000 g/mol; or
has a weight average molecular mass $M_w$, measured by CES, of greater than 1,000 g/mol or greater than 1,200 g/mol; or
has an IP polymolecularity index of less than 4.

6. The method according to claim 1, wherein:
from 5 to 90 mol % of the second acidity of the itaconic acid polymer is decarboxylated.

7. The method according to claim 1, wherein:
the itaconic acid polymer is totally neutralized or neutralized to 40 mol %; or
the itaconic acid polymer is neutralized with sodium hydroxide, sodium carbonate, or sodium bicarbonate.

8. The method according to claim 1, wherein:
the aqueous suspension of the at least one mineral material having a median particle size of 1.5±0.15 μm has a cationic demand less than or equal in absolute value to 5μ-equivalent per g of suspension of particles in water at a concentration of 65 to 75% by weight; or
the aqueous suspension of the at least one mineral material with a median particle size of 0.7±0.15 μm has a cationic demand less than or equal in absolute value to 13μ-equivalent per g of suspension of particles in water at a concentration of 65 to 75% by weight.

9. An aqueous composition, comprising mineral material particles produced by the method of claim 1.

10. The composition according to claim 9, wherein:
the aqueous suspension of the at least one mineral material having a median particle size of 1.5±0.15 μm has a cationic demand less than or equal in absolute value to 5μ-equivalent per g of suspension of particles in water at a concentration of 65 to 75% by weight; or
the aqueous suspension of the at least one mineral material with a median particle size of 0.7±0.15 μm has a cationic demand less than or equal in absolute value to 13μ-equivalent per g of suspension of particles in water at a concentration of 65 to 75% by weight.

11. The composition according to claim 9, further comprising at least one cellulosic material and optionally at least one additive.

12. A method for producing a paper-mass-loading composition or a paper-coating colour composition, the method comprising grinding at least one mineral material in the presence of water and at least one polymer to form an aqueous suspension of particles of the at least one mineral material,
wherein the at least one mineral material has a particle size of 0.05-50 pan,
wherein the at least one polymer is obtained by:
performing a radical polymerization reaction of a partial sodium salt of itaconic acid in the presence of sodium hypophosphite, at a temperature above 50° C., to obtained an itaconic acid polymer;
partially decarboxylating the itaconic acid polymer to obtain a decarboxylated polymer; and
partially or totally neutralizing the decarboxylated polymer with a derivative comprising sodium, to obtain the at least one polymer.

13. A grinding aid for particles of mineral material, the grinding aid comprising a polymer that is obtained by:
performing a radical polymerization reaction of a partial sodium salt of itaconic acid in the presence of sodium hypophosphite, at a temperature above 50° C., to obtained an itaconic acid polymer;
partially decarboxylating the itaconic acid polymer to obtain a decarboxylated polymer; and
partially or totally neutralizing the decarboxylated polymer with a derivative comprising sodium, to obtain the at least one polymer.

14. A method, comprising producing paper with the aqueous composition of claim 10.

15. The method according to claim 14, wherein the aqueous composition includes at least one cationic agent whose amount is reduced compared to a conventional papermaking process.

* * * * *